United States Patent
Lu et al.

(10) Patent No.: US 6,699,429 B2
(45) Date of Patent: Mar. 2, 2004

(54) METHOD OF MAKING SILICON NITRIDE-BONDED SILICON CARBIDE HONEYCOMB FILTERS

(75) Inventors: Yanxia Lu, Painted Post, NY (US); Dale R. Wexell, Corning, NY (US); Elizabeth M. Wheeler, Lindley, NY (US)

(73) Assignee: Corning Incorporated, Corning, NY (US)

( * ) Notice: Subject to any disclaimer, the term of this patent is extended or adjusted under 35 U.S.C. 154(b) by 105 days.

(21) Appl. No.: 10/210,308

(22) Filed: Aug. 1, 2002

(65) Prior Publication Data

US 2003/0057581 A1 Mar. 27, 2003

Related U.S. Application Data

(60) Provisional application No. 60/314,894, filed on Aug. 24, 2001.

(51) Int. Cl.[7] .............................................. C04B 33/32
(52) U.S. Cl. ........................ 264/630; 264/638; 264/642; 264/647
(58) Field of Search ................................ 264/630, 638, 264/642, 647

(56) References Cited

U.S. PATENT DOCUMENTS 4,629,707 A     12/1986   Wolfe
5,733,352 A  *  3/1998    Ogawa et al. ................. 55/523
5,935,888 A     8/1999    Toriyama et al.
6,555,031 B2 * 4/2003    Gadkaree et al. ........... 264/29.7
6,555,032 B2 * 4/2003    Gadkaree et al. ........... 264/29.7
2001/0036531 A1 11/2001  Sinohara et al.

FOREIGN PATENT DOCUMENTS

| GB | 2 105 316 | 3/1982 |
| JP | 3-223166 | 10/1991 |
| JP | 10-81568 | 3/1998 |
| WO | 01/47833 | 7/2001 |

\* cited by examiner

*Primary Examiner*—Christopher A. Fiorilla
(74) *Attorney, Agent, or Firm*—Anca C. Gheorghiu

(57) ABSTRACT

A process for forming a silicon nitride-bonded silicon carbide honeycomb monolith by a) forming a plasticizable mixture which includes (1) about 60% to 85% by weight, powdered silicon carbide with a median particle size of about 10–40 micrometers; (2) about 15% to 40% by weight, powdered silicon metal with a median particle size of about 5–20 micrometers; and, (3) organic components; b) extruding the plasticizable mixture to form a green honeycomb monolith; c) drying the green honeycomb monolith; and, d) heating the honeycomb monolith to 1450° C. with a hold of 1 hour in an atmosphere of argon; and, e) nitriding the honeycomb monolith between 1450° C. to 1600° C. for a time sufficient to obtain a silicon nitride-bonded silicon carbide body.

12 Claims, 4 Drawing Sheets

METHOD OF MAKING SILICON NITRIDE-BONDED SILICON CARBIDE HONEYCOMB FILTERS

This application claims the benefit of U.S. Provisional Application No. 60/314,894 filed Aug. 24, 2001, entitled "Method of Making Silicon Nitride-Bonded Silicon Carbide Honeycomb Filters", by Y. A. Lu et al.

BACKGROUND OF THE INVENTION

The present invention relates to a method of making silicon nitride-bonded silicon carbide honeycomb bodies useful in the removal of diesel soot particles from the exhaust gas of diesel engines.

Filters of diesel exhaust streams require a combination of high thermal shock resistance, chemical and mechanical durability in harsh environments, and good filtration efficiency.

Cordierite monolith filters have been in use for heavy duty engine applications for nearly two decades. Recently, there has been an increase in demand of filters for passenger diesel cars due to tightening environmental pollution regulations. However, it appears that in passenger cars, especially under conditions of "uncontrolled" regeneration (i.e., where the onset of combustion coincides with, or is immediately followed by high oxygen content and low exhaust gas flow rates resulting in high temperature spikes) existing cordierite filters have shown tendency for failure especially due to cracking or melting.

As an alternative to cordierite monolith filters, silicon carbide (SiC) filters have emerged as an option for diesel engine automobile applications. Benefits of these filters reside in the SiC's stable composition, high mechanical strength and high thermal conductivity. However, SiC has poor thermal shock resistance that results in cracking during regeneration. Consequently, current SiC diesel particulate filters have to be designed in segmental configuration to minimize cracking during use, which translates into higher manufacturing and product costs.

There is, accordingly a clear need for a process for making a monolith silicon carbide-based honeycomb body for diesel exhaust filtration applications.

SUMMARY OF THE INVENTION

Accordingly, the present invention is directed at a method of forming a silicon carbide-based honeycomb filter body by using silicon nitride to generate a uniform, strong bonded silicon carbide structure capable of being formed into a monolith honeycomb body having good mechanical strength, uniform pore structure and desirable thermal properties.

Specifically, the invention is directed at a process for forming a silicon nitride-bonded silicon carbide composite honeycomb monolith by a) forming a plasticizable mixture which includes (1) about 60% to 85% by weight, powdered silicon carbide; (2) about 10% to 40% by weight, powdered silicon metal; and, (3) organic components; b) extruding the plasticizable mixture to form a green honeycomb monolith; c) drying the green honeycomb monolith in air; and, d) heating the honeycomb monolith to 1450° C. with a hold of 1 hour in an atmosphere of argon; and, e) nitriding the honeycomb monolith above 1450° C. up to 1600° C. for a time sufficient to obtain a silicon nitride-bonded silicon carbide body. The gas environment is provided either by flow of the gas at a rate from 2 cubic feet per minute (cfm) or holding at 2 to 6 pounds per square inch (psi) positive pressure without continuing to flow the gas.

DETAILED DESCRIPTION OF THE INVENTION

Figure 1A:
FIG. 1a is a photomicrograph showing the representative microstructure at the fracture surface of the silicon nitride-bonded silicon carbide composite of the present invention.

The present invention relates to a method of making silicon carbide composite honeycomb bodies by using silicon nitride to generate a uniform, strong bonding of silicon carbide. The resulting honeycomb bodies possess good mechanical strength, uniform pore structure and desirable thermal properties especially for diesel particulate filtering applications.

A batch capable of being imparted plasticity thereto is first prepared from powdered silicon carbide and powdered silicon metal. Coarse median particle size of silicon carbide is necessary for a sufficiently large median pore size and good permeability, while fine silicon metal powder ensures uniform distribution of subsequently formed silicon nitride which bonds with the silicon carbide particles. The median particle size of the raw materials is measured in micrometers, and is derived from the volumetric distribution of particle sizes as measured by laser diffraction.

An advantageous mixture includes silicon carbide powder with a median particle size of 10 to 40 micrometers, at about 60% to 85% by weight of the raw material mixture, and silicon metal powder with a median particle size of 5 to 20 micrometers, at about 15% to 40% by weight of the raw material mixture.

The mixture further includes organic components such as a binder component and a lubricant component. Preferably, about 5% to 10% by weight of the raw material mixture, of a water-soluble thermoplastic temporary binder is added. Suitable temporary binders include methylcellulose, hydroxypropyl methylcellulose, and combinations thereof. A preferred temporary binder is Methocel A4M, a methylcellulose binder having a gel temperature of 50–55° C. and a gel strength of 5000 g/cm² (based on 2% solution at 65° C., manufactured by Dow Chemical, Midland, Mich.). Other suitable organic binders are Methocel F4M and F240M, hydroxypropyl methylcellulose, also manufactured by Dow Chemical Midland, Mich. Preferably about 0.5% to 1.0% by weight of the raw material mixture, of a lubricant, such as sodium stearate (available from Proctor & Gamble, Cincinnati, Ohio) is further added to the mixture.

The powdered raw materials are mixed together (but extensive milling of the particles during mixing which might substantially reduce the size of the particles in the mixture is to be avoided) and then with a solvent, such as deionized water, in an amount sufficient to impart homoginization and plasticity. Typically, water is added as a superaddition, in amounts ranging from 15% to 35% by weight (or solid content from 65% to 85% by weight), with levels ranging from 20% to 30%, by weight being preferred.

Following mixing, the resulting stiff and uniform, plasticized batch is shaped into a green body by any known conventional ceramic forming process, such as extrusion, injection molding, slip casting, centrifugal casting, pressure casting, dry pressing, and the like. The preferred shaping method is via extrusion through a die to form a honeycomb monolith body.

Once the batch mixture is plasticized and thereafter shaped into, for example a honeycomb structure, the so-formed structure is then dried by one of a variety of conventional techniques known to those skilled in the art, e.g., hot-air heating, microwave heating and dielectric heating. Preferably, the green honeycomb structures are dried for 1 to 3 days in a conventional oven at temperatures of up to between 90–110° C. to obtain crack-free bodies. As used herein a "honeycomb" is a structure that has an inlet and outlet end or face, and a multiplicity of cells extending from the inlet end to the outlet end, the cells having porous walls, and a cellular density in the range from about 100 cells/in$^2$ (15.5 cells/cm$^2$) to about 400 cells/in$^2$ (62 cells/cm$^2$), the walls having a thickness of about 0.010 and 0.030 inches (about 0.25 and 0.76 mm.)

The structures are then fired at rates of between 120–180° C./hour first in air to achieve binder burnout, followed by firing in an inert gas such as argon, to a temperature of 1450° C., where the structures are held for 1 hour. This period of time is important because it allows the silicon metal particles to migrate around the silicon carbide particles. At the end of this holding period the gas is switched to nitrogen and the bodies continue to be fired to a maximum of up to 1600° C., for a period of time sufficient to form silicon nitride particles to bond the silicon carbide particles, preferably with a holding period of 5 hours at 1600° C. Therefore, nitridation in the inventive process occurs above 1450° C. to 1600° C. over a total period of about 24 hours.

Figure 1B:
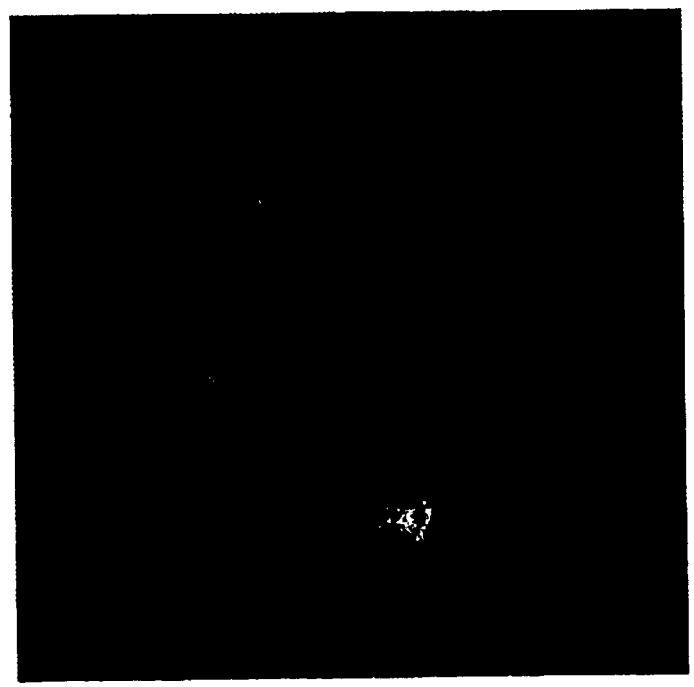
FIG. 1b is a photomicrograph showing the representative microstructure at the polished surface of the silicon nitride-bonded silicon carbide composite of the present invention.

In the present invention it is critical to control the nitridation process to obtain the desired microstructure. The holding step of 1 hour at 1450° C. is critical in forming a microstructure with large median pore size because it allows the silicon metal particles to move or migrate around the silicon carbide particles. Once the migration is finished the silicon metal can under go the nitridation process locally to form silicon nitride particles which bond the silicon carbide particles producing well rounded silicon nitride particles (as shown in FIG. 1a) which provide excellent, strong bonding with the silicon carbide particles and a microstructure with a large median pore size and/or good permeability (as shown in FIG. 1b). If the holding step at 1450° C. in argon is omitted, and nitridation process is begun below 1450° C., there are produced fiber-like silicon nitride particles which still produce good bonding with the silicon carbide, but promote a microstructure with a decreased median pore size and/or permeability which is undesirable for diesel filtration applications. Therefore, it is critical to hold at 1450° C. for 1 hour in argon and then switch the gas from argon to nitrogen to commence the nitridation process.

In a preferred embodiment, two or three gases were utilized for different purposes. Air is used for binder burnout at low temperatures, usually below 600° C. Following this stage, an inert gas is introduced into the atmosphere. It is believed that under these conditions the Si particles wet the SiC particles at high temperatures. Once nitrogen is introduced into the firing atmosphere, nitridation occurs. Before the binder burnout, air is circulated through the system. Following binder burnout, the inert gas or nitrogen gas can be kept either at positive pressure from 2 to 6 pounds per square inch (psi) or at a flow rate of 2 to 10 cubic feet per minute (cfm).

For diesel particulate filtration applications, the fired honeycomb bodies are plugged alternately at the inlet and outlet ends. Specifically, a portion of the cells of the honeycomb at the inlet end are plugged, as known in the art. The plugging is only at the ends of the cells which is typically to a depth of about 2 to 20 mm, although this can be varied. The plugging can be performed either prior to firing or after firing. A portion of the cells on the outlet end but not corresponding to those on the inlet end are plugged. Therefore, each cell is plugged only at one end. The preferred arrangement is to have every other cell on a given face plugged as in a checkered pattern.

EXAMPLES

To further illustrate the principles of the invention there will be described certain examples of silicon nitride-bonded silicon carbide monolith honeycomb substrates made according to the inventive method. Composition and properties of these examples are provided in the Table below. However, it is to be understood that the examples are given for illustrative purpose only, and the invention is not limited thereto, but various modifications and changes may be made in the invention, without departing form the spirit of the invention.

TABLE

| Example Number | 1 | 2 |
|---|---|---|
| Raw Materials | | |
| Si metal powder (% weight) | 22.5 | 18.0 |
| Median particle size of Si metal (μm) | 14 | 5 |
| SiC powder (% weight) | 67.5 | 72.0 |
| Median particle size of SiC (μm) | 12 | 27 |
| Binder, Lubricant and Solvent | | |
| Methylcellulose (% weight) | 9 | 9 |
| Sodium Stearate (% weight) | 1 | 1 |
| Water (% weight) | 23 | 24 |
| Firing Conditions | | |
| Nitridation Temperature (° C.) | 1450–1600 | 1450–1600 |
| Maximum Temperature (° C.) | 1600 | 1600 |
| Hold Time at Max. Temp. (hours) | 5 | 5 |
| Crystal Phase Assemblage | | |
| $Si_3N_4$ (% volume) | 35.7 | 29.4 |
| SiC (% volume) | 64.3 | 70.6 |
| Microstructure | | |
| Type of Bonding | Neck | Neck |
| Properties of Fired Ware | | |
| Median Pore Size (μm) | 9.6 | 8.6 |
| % Open Porosity | 51.4 | 44.0 |
| Permeability ($10^{-12}$ m$^2$) | 0.28 | 0.22 |
| Mean CTE 22–1000° C. ($10^{-7}$/° C.) | 38.0 | 38.1 |
| Four-Point Flexural Strength (lb/in$^2$) | 1080 | 1115 |
| Elastic Modulus (Mpsi) | 1.81 | 1.74 |

TABLE-continued

| Example Number | 1 | 2 |
|---|---|---|
| Material Bulk Density (g/cm³) | 1.64 | 1.69 |
| % Length Change after Firing | 0.6 | 0.3 |

The exemplary honeycomb substrates were prepared by weighing out the dry ingredients, mixing them with water or organic liquids, and kneading the mixture to form a plastic batch. The plastic batch was extruded into monolith honeycomb bodies of approximately 200 cells per square inch, with 0.016 inch walls. After drying, the green honeycomb bodies were fired in argon at a rate of between 120–180° C./hour through 1450° C. and held at this temperature for 1 hour. Then $N_2$ gas was introduced into the atmosphere and the bodies continued to be heated at a rate of between 120–180° C./hour to 1600° C., with a hold at this temperature for 5 hours, and then cooled to room temperature in $N_2$ gas.

For each fired body, the alternate channels of one face were plugged to a depth of about 6 to 12 mm with a cementitious material, after which the ends of the channels that were open on the first face were similarly plugged at their ends on the second face, such that each channel was plugged at one end and open at the other end. Channels that are open (not plugged) on the face of the filter through which a gas stream enters are referred as the "inlet" channels.

Percent open porosity and median pore size were determined by mercury porosimetry. The weight percentages of SiC and $Si_3N_4$ in the fired body were measured by powder x-ray diffractometry using internal standards.

Permeability was measured on the fired ribbon or pieces of cell wall using a Perm Automated Porometer® Version 6.0 (Porous Materials, Inc., Ithaca, N.Y.). The value of the permeability is obtained as follows. A piece of fired cell wall is mounted with epoxy onto a disc-shaped sample holder which has a circular opening. The epoxy is applied around the perimeter of the opening such that the sample covers the opening and such that no air can pass through the opening without passing through the sample, and such that the area of the sample through which the air passes is very nearly the same as the area of the circular opening of the sample holder. The sample is then placed in the chamber of the automated porometer and a differential air pressure is applied across the sample. The volumetric air flow on the outlet end of the sample is measured as a function of the pressure applied to the inlet face of the sample. The specific permeability, k, is then computed from the following relation:

$$k = \frac{\eta Q L}{A P}$$

where $\eta$ is the viscosity of air at room temperature in units of megapascal seconds, L is the thickness of the sample in units of meters, Q is the uniaxial volume flow rate of air through the sample in cubic meters per second, A is the area through which air is allowed to pass through the sample, approximately equal to the area of the opening of the sample holder, in units of square meters, and P is the differential pressure across the thickness of the sample in units of megapascals. The specific permeability, also referred to as permeability, is thus expressed in units of square meters, $m^2$.

Mean coefficients of thermal expansion from 22° C. to 1000° C. were measured on rod or honeycomb specimens using a dilatometer. Four-point flexural strengths were measured on honeycomb specimens. Elastic modulus was measured using ultrasonic resonance as known in the art. Material bulk density and % length change after firing were determined as known in the art.

The thermal expansion is an important parameter in high temperature applications, and is closely related to the durability of the filters during regeneration of the accumulated carbon soot. In the present invention the coefficient of thermal expansion (CTE) was measured by dilatometry from 22° C. to 1000° C.

Properties exhibited by the exemplary monolith silicon nitride-bonded silicon carbide diesel particulate filters were as follows: (1) a median pore size of about 6–10 micrometers; (2) an open porosity of about between 44% to 55%; (3) a permeability of above about $0.1 \times 10^{-12}$ $m^2$; (4) a median coefficient of thermal expansion from 22–1000° C. of about $38 \times 10^{-7}$/° C.; (5) a four-point flexural strength of about 1100 pounds per square inch; (6) an elastic modulus of about 1.5 Mpsi; (7) a bulk density of about 1.6 g/cm³; (8) a shrinkage of less than 1%; and (9) a phase composition of about 25–36% by weight silicon nitride and 64–75% by weight silicon carbide.

Figure 2:
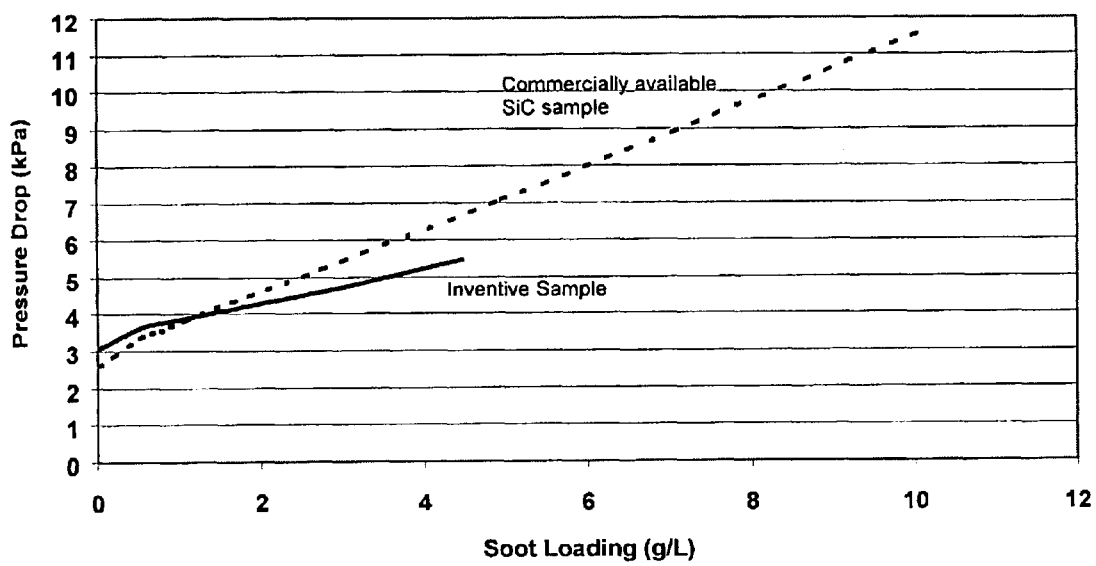
FIG. 2 compares pressure drop as a function of soot loading for an inventive diesel particulate filter (DPF) made according to the present invention and a comparative commercially available segmented SiC DPF.

The pressure drop and filtration efficiency in the exemplary silicon nitride-bonded silicon carbide diesel particulate filters was also tested. Results showed that the silicon nitride-bonded silicon carbide diesel particulate filters made according to the present invention have a low pressure drop across the length of the filter comparable to a commercially available SiC counterpart. This is illustrated in FIG. 2. The inventive DPF has a porosity of 44% and a median pore size of 8.6 micrometers, the comparative DPF has a porosity of 48% and a median pore size of 8.4 micrometers.

As can be seen at high filtration rates the pressure drop is even lower. The pressure drop across the filter is a function of the accumulation of the carbonaceous soot on the walls of the diesel particulate filter. As the amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure drop against the engine. The pressure drop increase at a given loading of soot (in grams/liter) depends upon the geometry of the filter, which includes cells density, wall thickness, filter length, and the like, as well as the pore structure of the walls, which includes pore size, pore shape, pore distribution, pore connectivity and porosity. Thus, the geometry of the filter and the pore structure influence pressure drop at both "clean" and soot loaded stage, which in turn, affects fuel economy.

The pressure drop was measured as follows. Each filter was wrapped in a ceramic fibrous mat and securely encased in a cylindrical metal holder. The holder and filter were attached at each end to metal pipes through which a stream of air was passed. The pressure drop across the filter, that is, the pressure difference between the inlet and outlet faces, was measured as a function of gas flow rate. Flow rates of 2.5–26.25 standard cubic feet per minute (scfm) were utilized for all samples. The pressure drops for these samples, prior to the introduction of carbon particles into the filters, are referred to as the "clean" pressure drops, and these clean pressure drops increase with increasing flow rate.

After the clean pressure drops were measured, the samples were transferred to a second facility where they were again attached to a metal pipe into which a stream of air was passed. A very fine carbon soot was then aspirated into this air stream for a period of time, thereby partially loading the filter with carbon by coating the walls of the inlet channels with a layer of carbon particles. The sample was then taken back to the first apparatus and its pressure drop re-measured as a function of flow rate. This process was repeated for various increasing levels of carbon soot loading. Thus, pressure drops were determined as a function of flow rate and mass of carbon soot contained within the filter. In most cases, levels of carbon soot loading ranged from approximately 0.3 to 12.0 grams per liter of filter volume.

Figure 3:
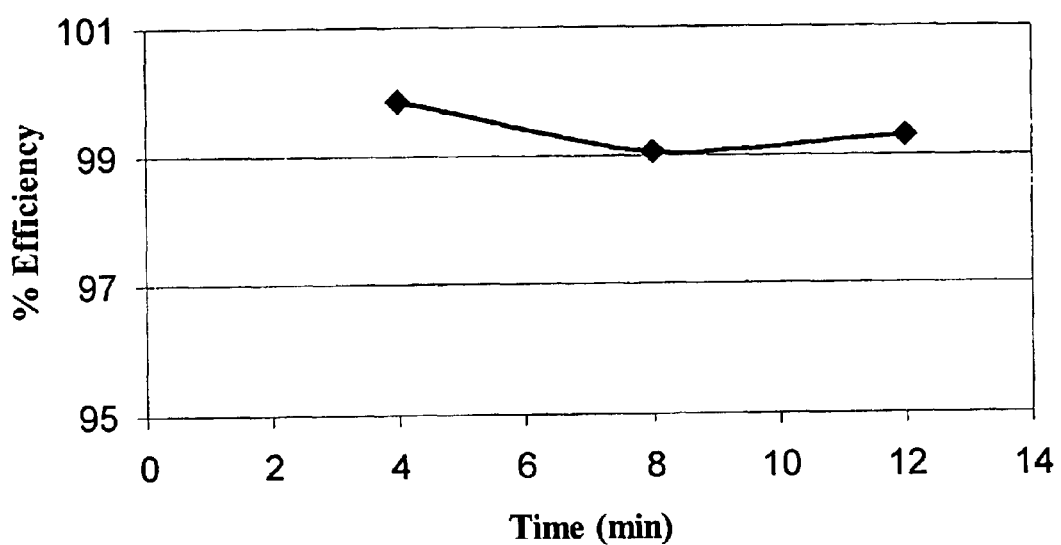
FIG. 3 shows the filtration efficiency of an inventive diesel particulate filter made according to the present invention; and, FIG. 4 compares the exothermic temperatures during an uncontrolled regeneration of inventive diesel particulate filters made according to the present invention and a commercially available segmented SiC DPF.

Diesel particulate filters must also possess a high percent filtration efficiency, defined as the mass of the particles captured by the filter divided by the mass of particles that entered the filter, multiplied by 100. It is desirable that the filter not only have a low pressure drop, but must also have a filtration efficiency of at least 90%. As seen in FIG. 3, inventive filters exhibit excellent filtration efficiencies up to and in excess of 95%.

Figure 4:
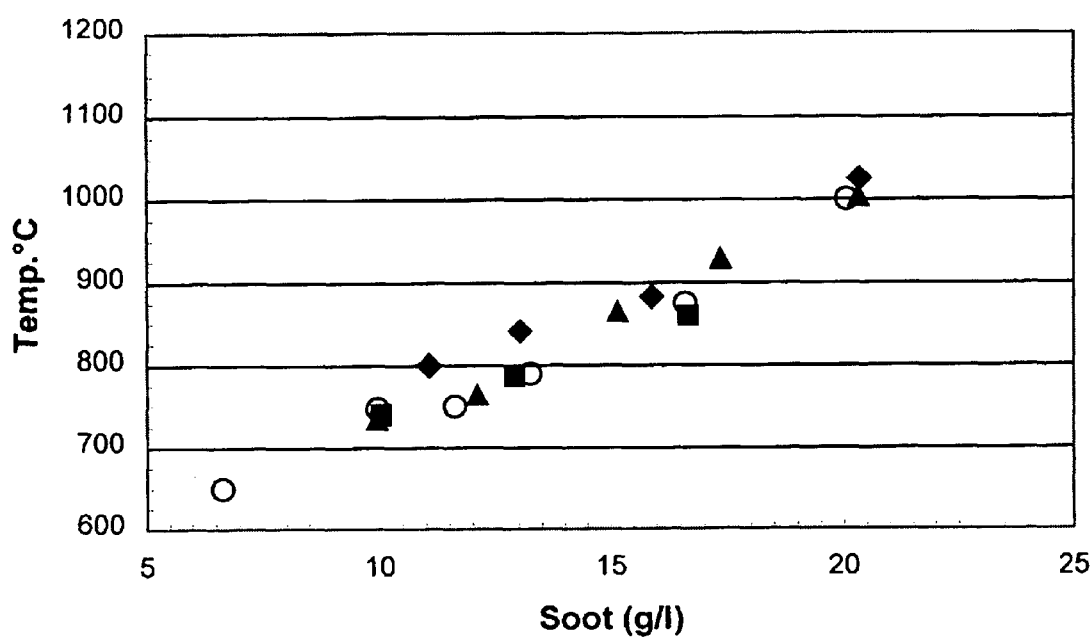

The thermal behavior during regeneration determines the thermal durability of the filter structure. DPFs require quick regeneration, making high thermal conductivity and low thermal heat capacity paramount. Additionally, DPFs must survive thermal cycling, requiring high thermal shock resistance. Is further desired that filter temperatures during regeneration not exceed 1100° C. to avoid the sintering of ash during regeneration. The inventive filters posses excellent thermal properties as shown in FIG. 4. Therein illustrate is a plot of Temperature (° C) on the X-axis as a function of Soot Loading on the Y-axis, comparing three inventive DPFs (represented by the closed triangle, square and diamond shaped symbols) and a commercially available (represented by the open circle symbol) SiC DPF. The inventive filters survive regenerations even at extreme soot loading conditions.

From the foregoing examples, it is apparent that by employing the novel process of the present invention it is possible to produce monolith silicon carbide composite honeycomb bodies for diesel exhaust filtration applications by utilizing silicon nitride to generate a uniform, strong bonding of silicon carbide.

What is claimed is:

1. A process for forming a silicon nitride-bonded silicon carbide honeycomb monolith, the process comprising:
   a) forming a plasticizable mixture comprising:
      (1) about 60% to 85% by weight, powdered silicon carbide;
      (2) about 15% to 40% by weight, powdered silicon metal; and,
      (3) organic components;
   b) extruding the plasticizable mixture into a honeycomb monolith having an inlet and outlet end or face, and a multiplicity of cells extending from the inlet end to the outlet end, the cells having porous walls;
   c) drying the honeycomb monolith; and,
   d) heating the honeycomb monolith to 1450° C. with a hold of 1 hour in an atmosphere of argon; and,
   e) nitriding the honeycomb monolith above 1450° C. to 1600° C. for a time sufficient to obtain a silicon nitride-bonded silicon carbide body.

2. The process of claim 1 wherein the organic components are selected from the group consisting of a binder, a lubricant, and combinations thereof.

3. The process of claim 2 wherein the binder is a water-soluble thermoplastic temporary binder.

4. The process of claim 3 wherein the thermoplastic temporary binder is methylcellulose.

5. The process of claim 4 wherein the methylcellulose binder is added in an amount of 5% to 10% by weight.

6. The process of claim 2 wherein the lubricant is sodium stearate.

7. The process of claim 6 wherein the sodium stearate lubricant is added in an amount of 0.5% to 1.0%, by weight.

8. The process of claim 1 wherein the mixture further contains a solvent.

9. The process of claim 8 wherein the solvent is water.

10. The process of claim 8 wherein water is added as a superaddition, in an amount of 15% to 35% by weight.

11. The process of claim 10 wherein the silicon metal has a median particle size of about 5 to 20 micrometers.

12. The process of claim 11 wherein the silicon carbide has a median particle size of 10 to 40 micrometers.

* * * * *